United States Patent
Huber et al.

(10) Patent No.: US 9,682,730 B2
(45) Date of Patent: Jun. 20, 2017

(54) MOTOR VEHICLE BODY FOR LIGHT WEIGHT CONSTRUCTION

(75) Inventors: Florian Huber, Grassau (DE); Manuel Frank, Hallein (AT); Alexandre Rossier, Hallein (AT)

(73) Assignee: KTM-Sportmotorcycle AG, Mattighofen (CH)

( * ) Notice: Subject to any disclaimer, the term of this patent is extended or adjusted under 35 U.S.C. 154(b) by 28 days.

(21) Appl. No.: 14/342,501

(22) PCT Filed: Oct. 27, 2011

(86) PCT No.: PCT/EP2011/068888
§ 371 (c)(1),
(2), (4) Date: Dec. 2, 2014

(87) PCT Pub. No.: WO2013/029695
PCT Pub. Date: Mar. 7, 2013

(65) Prior Publication Data
US 2015/0291228 A1    Oct. 15, 2015

Related U.S. Application Data

(60) Provisional application No. 61/530,631, filed on Sep. 2, 2011.

(51) Int. Cl.
*B62D 29/04* (2006.01)
*B62D 23/00* (2006.01)
(Continued)

(52) U.S. Cl.
CPC .............. *B62D 29/043* (2013.01); *B60R 5/02* (2013.01); *B62D 23/005* (2013.01); *B62D 25/02* (2013.01);
(Continued)

(58) Field of Classification Search
CPC ...... B62D 23/00; B62D 23/005; B62D 25/02; B62D 25/2009; B62D 25/2036;
(Continued)

(56) References Cited

U.S. PATENT DOCUMENTS 4,438,971 A    3/1984  Zaydel et al.
5,934,745 A    8/1999  Moore et al.
(Continued)

FOREIGN PATENT DOCUMENTS

CN    1356231 A    7/2002
DE    1 480 603    10/1969
(Continued)

OTHER PUBLICATIONS

English translation of FR 2,732,301; retreived Feb. 22, 2016 via PatentTranslate located at www.epo.org.*
(Continued)

*Primary Examiner* — Jason S Daniels
(74) *Attorney, Agent, or Firm* — Pauley Erickson & Kottis

(57) ABSTRACT

A motor vehicle body for light weight construction comprises at least a bottom unit, a roof and side units (3), which are assembled to form at least part of the motor vehicle body. At least the side units include an inner shell element (3a) and an outer shell element (3g) made of injection molded plastics material and are attached to each other by attachment areas (4) to form a torsion stiff box structure. The inner and/or outer shell element may comprise a strut structure (5) extending from an inner shell element surface in between the shell elements towards the opposing shell element to realize the torsion stiff box structure.

19 Claims, 4 Drawing Sheets

(51) Int. Cl.
*B62D 25/20* (2006.01)
*B62D 25/02* (2006.01)
*B62D 31/00* (2006.01)
*B60R 5/02* (2006.01)

(52) U.S. Cl.
CPC ..... *B62D 25/2009* (2013.01); *B62D 25/2036* (2013.01); *B62D 29/046* (2013.01); *B62D 31/003* (2013.01)

(58) Field of Classification Search
CPC .... B62D 27/026; B62D 27/065; B62D 29/04; B62D 29/043; B62D 29/046; B62D 29/048; B62D 31/003
USPC ............................................ 296/181.1, 181.2
See application file for complete search history.

(56) References Cited

U.S. PATENT DOCUMENTS

| | | | | |
|---|---|---|---|---|
| 8,550,544 | B2* | 10/2013 | Auer | B62D 25/2036 29/897.2 |
| 2003/0230443 | A1* | 12/2003 | Cramer | B60G 3/20 180/65.51 |
| 2004/0104601 | A1* | 6/2004 | Durand | B62D 23/005 296/203.01 |
| 2012/0068496 | A1* | 3/2012 | Ellis | B29C 41/06 296/181.1 |
| 2012/0104793 | A1* | 5/2012 | Danielson | B62D 29/046 296/181.1 |

FOREIGN PATENT DOCUMENTS

| | | |
|---|---|---|
| DE | 43 06 094 A1 | 9/1994 |
| DE | 195 08 970 A1 | 2/1996 |
| DE | 102 52 475 A1 | 5/2004 |
| DE | 10 2007 037 510 A1 | 2/2009 |
| FR | 2 732 301 | 10/1996 |
| JP | 01/64-32981 | 2/1989 |
| JP | 3-123781 | 12/1991 |

OTHER PUBLICATIONS

Intellectual Property Office of P.R. China, "Second Notification of Examiner's Opinion," Chinese Patent Application No. 201180073041.8, Issued Feb. 25, 2016, 10 pages.

* cited by examiner

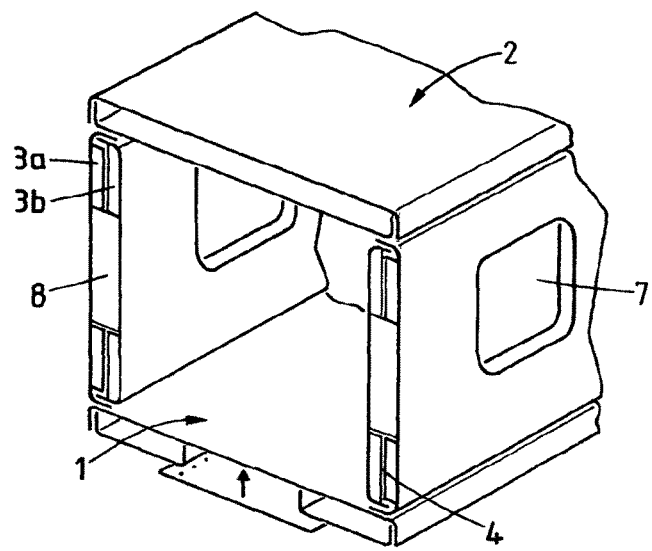
Fig. 4
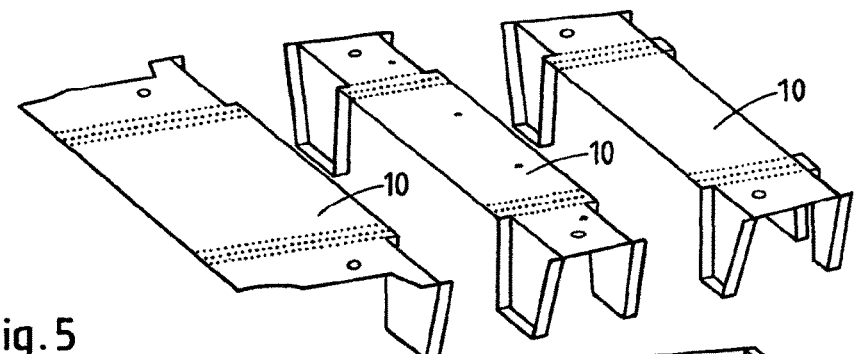
Fig. 5
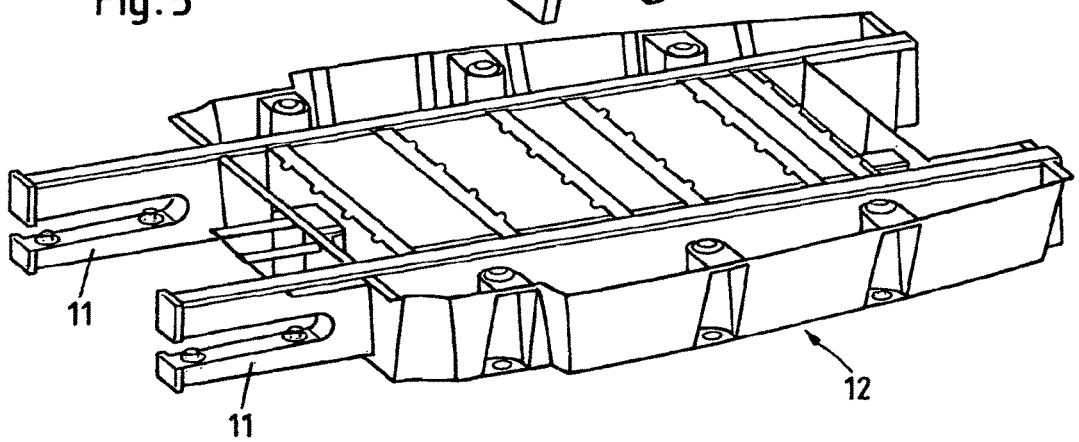

MOTOR VEHICLE BODY FOR LIGHT WEIGHT CONSTRUCTION

BACKGROUND OF THE INVENTION

Field of the Invention

The invention relates to a motor vehicle body for a light weight construction, e.g. for cars, comprising at least a bottom unit, a roof and side units, which are assembled to form at least part of the motor vehicle body.

Discussion of Related Art

In general a motor vehicle body comprising a self-supporting construction is designed of a plurality of metal plates or sheets, which are assembled to build the motor vehicle body. To save weight motor vehicle bodies have been developed, that comprise plastic parts, which are usually mounted on metal parts but which do not have a load-bearing function.

U.S. Pat. No. 4,438,971 shows a motor vehicle comprising several plastic body outer panels on a dimensionally variable underlying metal body structure. A plurality of plastic filled attachment blocks are welded at selected points on the body structure to approximately align with aperture mounting faces provided on the plastic panels. Fasteners hold the mounting faces in contact with panel support faces of the attachment blocks so that each body outer panel is mounted without distortion of its visible outer surface and the surface of each of the plastic panels is mounted in surface alignment with each adjacent plastic panel.

Another motor vehicle body including plastic parts is known from DE 1 480603 or DE 4306094.

Production of motor vehicle bodies made of different materials and and a plurality of separate parts is time consuming and increases the costs of a motor vehicle body. More simple structures of only plastic material for example for motorized trollies or the like miss the stability and safety required for motor vehicles for everyday use.

It is an object of the present invention to provide a motor vehicle body and a method to produce such motor vehicle body, which allow a robust and weight saving structure of the motor vehicle body and a simple and cost-efficient production thereof.

These and other objects, which will appear from the description below, are achieved by a motor vehicle body for light weight construction and a method for producing the same as set forth in the appended independent claims. Advantageous embodiments and further developments are defined in the dependent claims.

SUMMARY OF THE INVENTION

According to the disclosure a motor vehicle body for light weight construction comprises at least a bottom unit, a roof and side units, which are assembled to form at least part of a load bearing structure of the motor vehicle body. The bottom unit may comprise a basis with a set of cross beams and longitudinal beams, and/or a box like structure assembled to build up the bottom unit. The bottom unit can be made of metal (i.e. sheet metal) and/or plastic material (e.g. injection molded parts). The bottom unit can be foreseen to receive a battery pack or a fuel tank.

At least the side units consist of at least one inner shell element and at least one outer shell element which are assembled to form a load-bearing structure. In the assembled state of the motor vehicle body the inner shell is preferably positioned facing to inside of the body and the outer shell is positioned facing to the outside of the body. The inner and outer shell elements are at least partially made of injection molded plastics material, which allows easy profiling of the shells and a light weight. The inner and outer shell elements are in general interconnected to each other by attachment areas to form a (torsion) stiff box structure which is very effective. Several attachment points may be distributed on the shell elements or larger attachment areas may be provided on the shell element surfaces in between the inner and outer shell.

Also an attachment area may be given by an attachment line surrounding the circumference of a side unit or by attachment lines running along the surface of the shell elements. The torsion stiff box structure results at least partially from the attachment of an inner shell element and an outer shell element along the attachment areas on each other, where in the shell elements comprise an inner structure to provide a plurality of boxes or cavities in between the inner and outer shell. Advantageously the shell elements may be realized as half shell elements together forming the side unit.

In general no larger metal parts are required to build up the side unit of the motor vehicle body (beside fittings or hinges, etc.). Basically the side units can be designed of only two main parts, namely the inner shell element and the outer shell element. Therefore the side units show a light weight construction. The manufacturing of the main parts of the side units by injection molding allows an inexpensive and fast production of the motor vehicle body. Furthermore recycling becomes very easy. However, the stiff box structure ensures a construction of the motor vehicle body, which fulfilling modern safety requirements, because of excellent load transmission and shock absorption features.

Advantageously the shell elements are produced by an injection molding process. The shell elements are, for example, made of thermoplastic resin and/or thermoset resin. If required the shell elements can be build up from several parts. Furthermore fibers or other filling material can be added to the resin to influence the mechanical characteristics, e.g. to increase the e-modulus. Furthermore it is possible to add a tint to the injection molded material therefore the shell elements forming visible surfaces do not need to be colored at a later stage. This in addition reduces the manufacturing cost.

In one embodiment the inner and/or outer shell element comprise a strut structure extending from an inner shell element surface in between the shell elements towards the opposing shell element to increase the mechanical stability and the load-bearing capacity. Alternatively or in addition the strut structure can be designed to act as flow aid to distribute the material during the injection molding process. The strut structure may form a plurality of open or closed boxes along the inner shell element surface and acts as reinforcement of the stiffness of the plane of the shell elements.

The strut structure may comprise a plurality of struts extending essentially perpendicular from the inner shell element surface and distributed over the shell element surface. The struts may be arranged in regular patterns, e.g. in zigzag lines or star patterns, or may be arbitrarily distributed on the shell element surface. The struts may be closer to each other in some areas than in others, such that a varying strut density results on the shell element surface. The strut density may, for example, be increased in areas of high load impact on the side of the motor vehicle body. Also the struts of the strut structure may comprise different thickness. The thickness of the struts can be chosen according to different stress or strain zones of the side unit. For example the strut structure can be intensified in load transmission areas of the motor vehicle body. The torsion stiff box structure allows strengthening of the shell structure of the side unit and enables to design individual squash and deformation zones.

The strut structure acts to support the shell elements on each other, stiffen each of the shell element and to enhance the torsion stiffness of the assembled side unit by connecting the shell elements with each other.

To realize the torsion stiff box structure in a simple manner the strut structure of one shell element rests against the inner shell element surface of an opposing shell element. Such the shell elements may support each other over the full surface plane and several boxes are formed between the inner and outer shell elements, which are confined by the struts.

At least parts of the strut structure can comprise the attachment areas for attachment of the opposing shell element. That means edges of the struts abut the opposing shell element or the strut structure thereof and are attached thereto on the abutment area. For example there can be provided first attachment areas on the strut structure of the outer shell element, which are attached to second attachment areas on the strut structure of the inner shell element. In general the strut structure of the inner shell and the strut structure of the outer shell can support each another and together realize the torsion stiff box structure. Some of the struts of one shell element may be provided with attachment means, which cooperate with opposing attachment means on the other shell element. The attachment means may be provided by a positive locking engagement, like a snap connection or a screw connection. Although other attachments may be used. In general the attachment areas may also be attached for example by adhesion or welding of the plastics material.

In one embodiment the box structure at least partially is filled e.g. by foam material and/or honey comb material. The material may enhance the stiffness but does not contribute much to the weight of the motor vehicle body. Furthermore the filling material may be foreseen to absorb sound and/or the increase the load-bearing capability and/or to increase the absorption capacity of mechanical energy in the case of a crash. The foam material or honey comb material may be embedded in between the struts of the strut structure. Alternatively or in addition the filler material can e.g. be injected by an opening into a closed box structure.

The outer surface of the shell elements may provide an interior and/or an exterior motor vehicle surface respectively. The outer surface of the shell elements can for example be designed according to the aerodynamic or fashionable aspects. Also is comprise functional features as placement areas, arm rest or the like.

Furthermore the shell elements can comprise through openings to connect the interior and exterior of the motor vehicle. The through openings may be provided as windows in the side unit or as insertion area for other devices of the motor vehicle. Also a storage space can be provided in between the strut structure. For example the storage space is divided into several storage chambers by struts of the strut structure. The storage space or the chambers may be used for for electrical equipment of the motor vehicle.

In general also the bottom unit, the roof and further parts of the motor vehicle body, like front or rear units, may consist of two shell elements as disclosed above for the side units.

According to a method for producing a motor vehicle body for light weight construction according to the disclosure at least a bottom unit, a roof and side units are assembled to form at least part of the motor vehicle body. An inner shell element and an outer shell element made of plastics material are produced by injection molding. Then they are attached on each other at attachment areas to provide the side units. The attachment areas are selected such, that the inner shell element and the outer shell element form a torsion stiff box structure in the assembled state. The attachment may be reversible or nonreversible.

BRIEF DESCRIPTION OF THE DRAWINGS

These and other features and advantages of the invention will become apparent upon consideration of the accompanying drawings, which may explain the principles of the invention but shall not limit the scope of the invention. The drawings illustrate:

FIG. 4: three-dimensional cross-sectional view of a motor vehicle body according to the invention, and FIG. 5: exploded view of a bottom unit of a motor vehicle body according to the invention.

DETAILED DESCRIPTION OF THE INVENTION

Figure 1A:
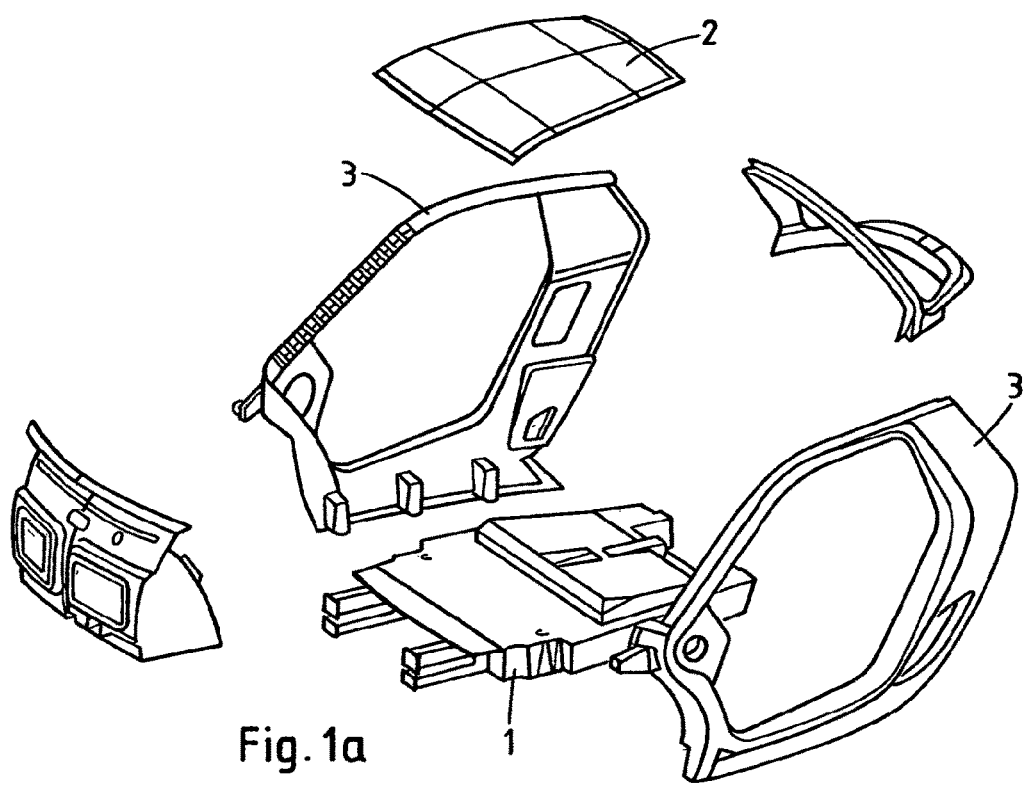
FIG. 1a: exploded view of a motor vehicle body according to the present invention.
Figure 1B:
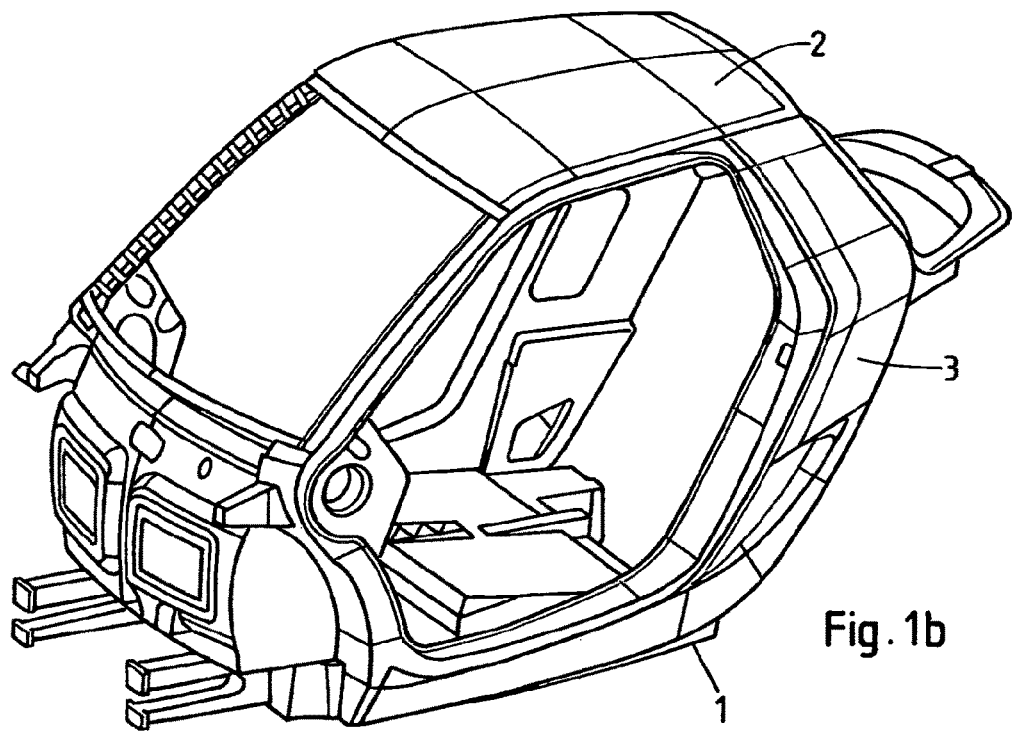
FIG. 1b: assembled view of the motor vehicle body according to FIG. 1a, FIG. 2: exploded view of an inner shell element and an outer shell element of a side unit.

In FIG. 1a, a motor vehicle body is shown in an exploded view and in FIG. 1b in an assembled view. The motor vehicle body comprises a bottom unit 1, a roof 2 and side units 3 on left and right side. Furthermore a front unit and a rear unit are shown schematically. In FIG. 2b all parts of the motor vehicle body are assembled.

Figure 2:
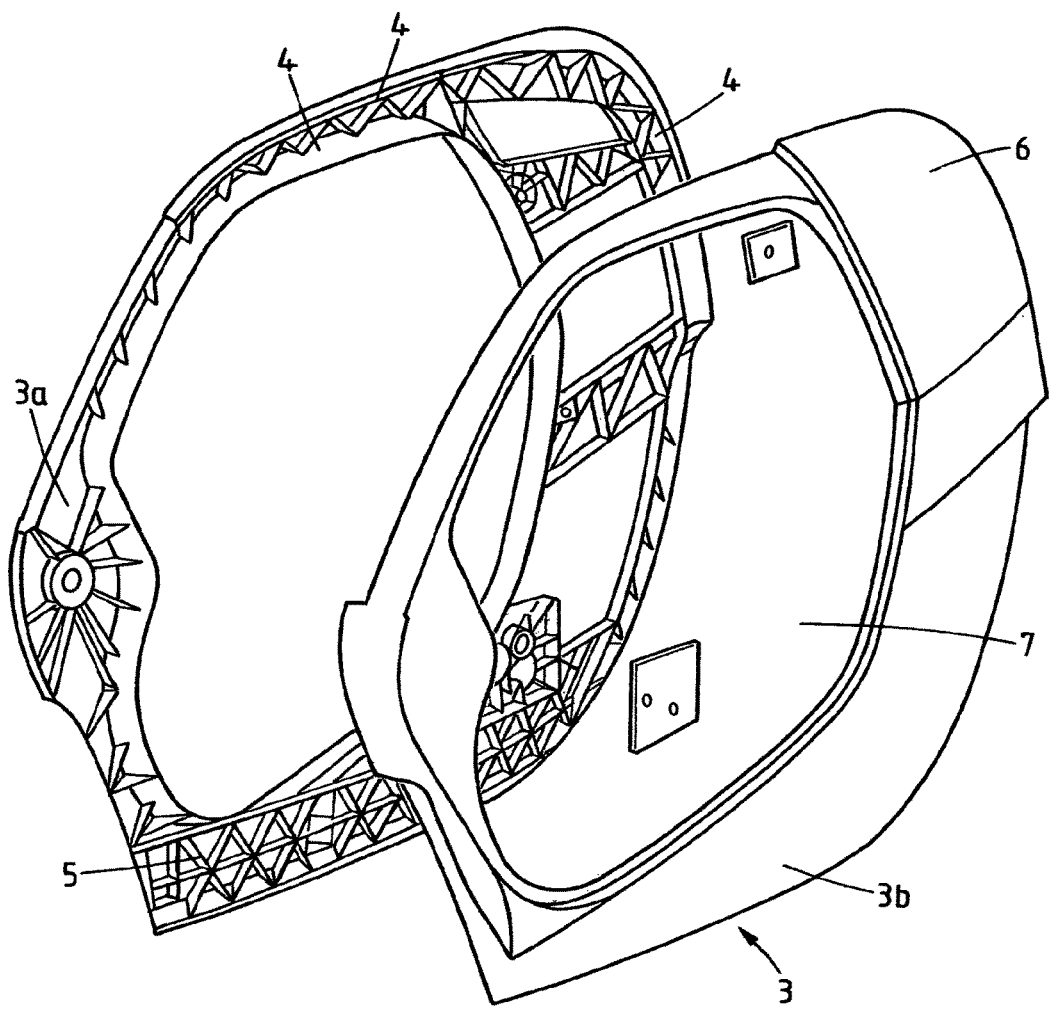

In FIG. 2 the side unit 3 of the left side of the motor vehicle body is shown. The side unit 3 comprises two shell element, an inner shell element 3a and an outer shell element 3b. The shell elements 3a and 3b comprise a plurality of attachment areas 4 on their inner surface facing towards the opposing other shell element. The attachment areas 4 are provided along the edge of the shell elements and also on the central plane of the shell elements. A strut structure 5 is provided on the inner surface of the shell elements 3a and 3b, which is realized by a plurality of struts distributed over the inner surface. As can be seen the struts are aligned in zigzag shape, star shapes and other regular or irregular patterns. Some of the struts are provided with the attachment areas. When assembling the shell elements 3a and 3b to build up the side unit 3, the strut structure of the inner shell element 3a rests against the strut structure of the shell element 3b. Thus both strut structures support each other and serve as common torsion stiff box structure. The shell elements 3a and 3b are provided with a through opening 7, which serves as a window in the side unit. Furthermore the outer shell element 3b comprises an exterior surface 6, which is designed according to the outer shape of the motor vehicle.

Figure 3A:
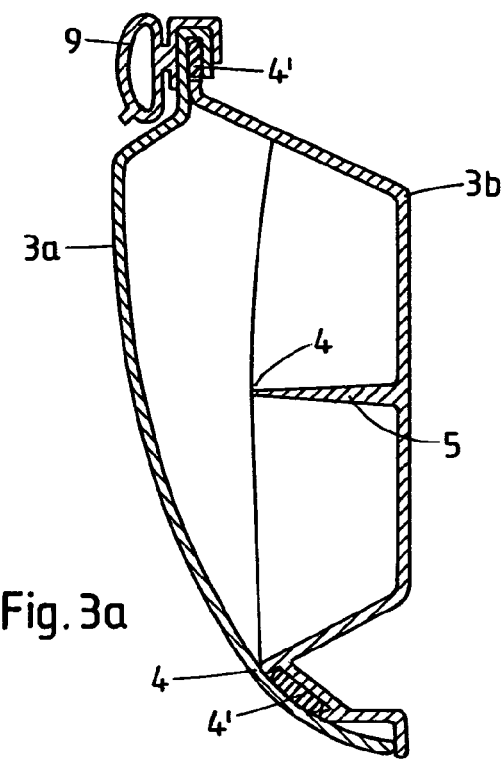
FIG. 3a: first schematic illustration of an attachment of inner shell element and outer shell element.
Figure 3B:
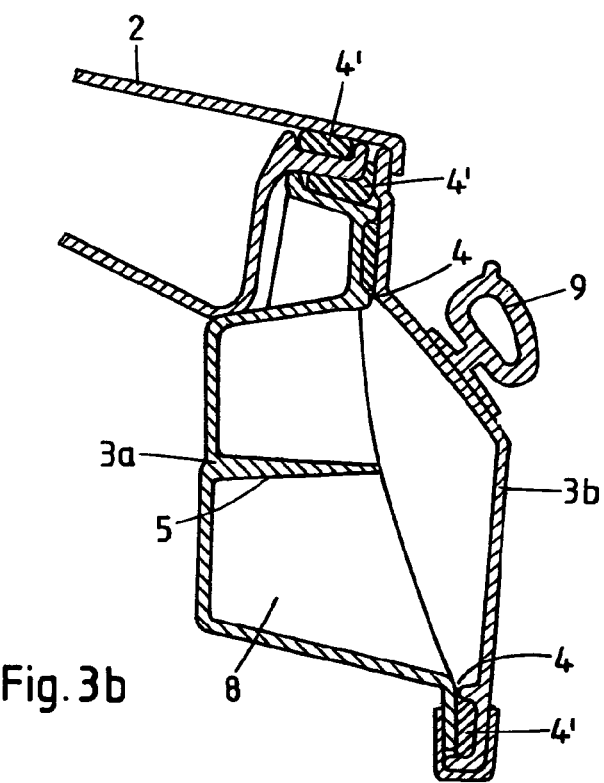
FIG. 3b: second schematic illustration of an attachment of inner shell element and outer shell element.

In FIGS. 3a and 3b schematic illustrations of an attachment of inner shell element and outer shell element is shown. The inner and outer shell element 3a and 3b are touch each other at the attachment areas 4 and are attached to each other, e.g., by attachment means 4'. Sealing means 9 are provided to seal the joint line. The struts of the structure basically extend from perpendicularly from the surface of the shell elements. The edges of the struts of the inner shell element 3a touch the struts of the outer shell element 3b. As shown in FIG. 3b a roof 2 can be attached to the side unit in the same manner as the shell element are attached to each other. In between the shell elements, storage spaces 8 are provided. The spaces may be filled with foam material or other stiffening material or may accommodate other means necessary for the motor vehicle.

In FIG. 4 a cross sectional cut out of a motor vehicle body is shown. The left and the right side units are both provided by an inner shell element 3a and an outer shell element 3b. No other parts are required to gain the stability required for motor vehicles. The side units are mounted on the bottom unit 1 and to the roof 2. The struts of the strut structures of the two shell elements support each other and therefore increase the torsion stiffness of the side unit.

In FIG. 5 a bottom unit 1 is shown which is assembled of cross beams 10 and longitudinal beams 11, which are mounted on a bottom basis 12. The cross beam 10, the longitudinal beams 11 and the bottom basis 12 may comprise a torsion stiff box structure as explained above for the side unit.

The invention claimed is:

1. A motor vehicle body for light weight construction comprising:
    at least a bottom unit, a roof and side units, assembled to form at least part of the motor vehicle body, wherein at least the side units include an inner shell element and an outer shell element made of injection molded plastics material and attached on each other by attachment areas to form a load-bearing box structure, wherein the at least one bottom unit is an individual part assembled of cross beams and longitudinal beams which are mounted on a bottom base, wherein the cross beams, the longitudinal beams and the bottom base comprise a torsion stiff box structure.

2. The motor vehicle body according to claim 1, wherein the shell elements are realized as half shell elements together forming the side unit.

3. The motor vehicle body according to claim 1, wherein the strut structure comprises a plurality of struts extending essentially perpendicular from the inner shell element surface and distributed over the shell element surface.

4. The motor vehicle body according to claim 1, wherein the strut structure of one shell element rests at least partially against an inner shell element surface of an opposite shell element providing the box structure.

5. The motor vehicle body according to claim 1, wherein at least parts of the strut structure comprise the attachment areas for attachment of the opposing shell element.

6. The motor vehicle body according to claim 5, wherein first attachment areas on the strut structure of the outer shell element are attached to second attachment areas on the strut structure of the inner shell element.

7. The motor vehicle body according to claim 6, wherein the strut structure of the inner shell and the strut structure of the outer shell support each another.

8. The motor vehicle body according to claim 1, wherein at least parts of the strut structure comprise a load-bearing area of the motor vehicle body.

9. The motor vehicle body according to claim 1, wherein the box structure at least partially is filled by foam material and/or honey comb material.

10. The motor vehicle body according to claim 1, wherein the attachment areas are attached by adhesion, welding of the plastics material and/or positive locking attachment.

11. The motor vehicle body according to claim 1, wherein our surfaces of the shell elements provide an interior and/or an exterior motor vehicle surface respectively.

12. The motor vehicle body according to claim 1, wherein the shell elements are made of thermoplastic resin or thermoset resin.

13. The motor vehicle body according to claim 1, wherein the shell elements comprise through openings to connect the interior and exterior of the motor vehicle.

14. The motor vehicle body according to claim 1, wherein a storage space is provided in between the strut structure.

15. The motor vehicle body according to claim 14, wherein the storage space is divided into several storage chambers by struts of a strut structure.

16. The motor vehicle comprising the motor vehicle body according to claim 1.

17. The motor vehicle body according to claim 1, wherein the attachment areas are attached by screw connections or snap connections.

18. A method for producing a motor vehicle body for light weight construction, comprising:
    assembling, at least a bottom unit, a roof and side units to form at least part of the motor vehicle body,
    producing an inner shell element and an outer shell element made of plastics material by injection molding and
    attaching the inner shell element and the outer shell element to each other at attachment areas to provide the side units, wherein the attachment areas are selected such that the inner shell element and the outer shell element form a torsion stiff box structure assembled of cross beams and longitudinal beams which are mounted on a bottom base in the assembled state.

19. A motor vehicle body for light weight construction comprising:
    at least a bottom unit, a roof and side units, assembled to form at least part of the motor vehicle body, wherein at least the side units include an inner shell element and an outer shell element made of injection molded plastics material and attached on each other by attachment areas to form a load-bearing box structure, wherein the at least one bottom unit is made as an individual part assembled of cross beams and longitudinal beams which are mounted on a bottom base, wherein the cross beams, the longitudinal beams and the bottom base comprise a torsion stiff box structure.

* * * * *